(No Model.)
T. A. EDISON.
SHAFTING.
No. 271,614. Patented Feb. 6, 1883.
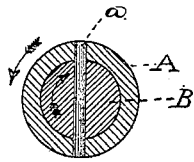
ATTEST:
Edw. C. Rowland
H. W. Seely
INVENTOR:
Thomas A. Edison
By Rich'd N. Dyer,
Atty.

UNITED STATES PATENT OFFICE.

THOMAS A. EDISON, OF MENLO PARK, NEW JERSEY.

SHAFTING.

SPECIFICATION forming part of Letters Patent No. 271,614, dated February 6, 1883.

Application filed October 20, 1882. (No model.)

*To all whom it may concern:*

Be it known that I, THOMAS A. EDISON, of Menlo Park, in the county of Middlesex and State of New Jersey, have invented a new and useful Improvement in Shafting, (Case No. 502,) of which the following is a specification.

The object I have in view is to produce shafting in which the torsional elasticity will be reduced to the minimum or destroyed altogether. This I accomplish by constructing a shaft in two parts, one being placed within the other. These parts are proportioned to have the desired strength, and relatively to have the same or nearly the same torsional elasticity. After being placed one within the other the two parts of the shaft are twisted in opposite directions, being strained up to the limits of their torsional elasticity, when they are secured together in any suitable way, so that they will react upon each other and balance the torsional elasticity, producing a rigid shaft. This may be done by drilling holes through the two parts of the shaft and driving pins through them, or by coupling the two parts of the shaft together at their ends. Both of these methods of securing the two parts together may, however, be combined.

In the accompanying drawing a cross-section of the non-torsional shafting is shown.

A and B are the two parts of the shaft, placed one within the other, the inner part, B, being either solid or of tubular form. The parts are twisted in opposite directions, as shown by the arrows, and strained to the limits of their torsional elasticity, when they are fastened together by pins $a$, or by other suitable means. The shaft may be constructed of iron, steel, or other suitable material. I have found this character of shafting exceedingly efficient for use in connecting the governors of several engines together, so as to force the engines to act in unison; but I do not wish to limit myself to any particular use, since it is applicable to all uses where non-torsional shafting would be advantageous.

What I claim is—

A non-torsional shaft constructed in two parts, strained torsionally in opposite directions and connected together permanently while under such torsional strain, substantially as set forth.

This specification signed and witnessed this 19th day of October, 1882.

THOS. A. EDISON.

Witnesses:
RICHD. N. DYER,
H. W. SEELY.